United States Patent [19]
Bennett

[11] Patent Number: 5,165,243
[45] Date of Patent: Nov. 24, 1992

[54] COMPACT ACOUSTIC REFRIGERATOR

[75] Inventor: Gloria A. Bennett, Los Alamos, N. Mex.

[73] Assignee: The United States of America as represented by the United States Department of Energy, Washington, D.C.

[21] Appl. No.: 710,207

[22] Filed: Jun. 4, 1991

[51] Int. Cl.$^5$ ............................................. F25B 9/00
[52] U.S. Cl. .......................................... 62/6; 60/721; 62/259.2; 165/104.33
[58] Field of Search ................... 62/6, 259.2; 60/721; 165/104.33

[56] References Cited

U.S. PATENT DOCUMENTS

| | | | |
|---|---|---|---|
| 2,836,033 | 5/1958 | Morrison | 60/516 |
| 3,237,421 | 3/1966 | Gifford | 62/6 |
| 4,114,380 | 9/1978 | Ceperley | 62/467 |
| 4,355,517 | 10/1982 | Ceperley | 60/721 |
| 4,398,398 | 8/1983 | Wheatley et al. | 62/6 |
| 4,489,553 | 12/1984 | Wheatley et al. | 62/6 |
| 4,599,551 | 7/1986 | Wheatley et al. | |
| 4,722,201 | 2/1988 | Wheatley et al. | 62/6 |
| 4,858,441 | 8/1989 | Wheatley et al. | 62/6 |
| 4,953,366 | 9/1990 | Swift et al. | 60/721 |

OTHER PUBLICATIONS

G. W. Swift, "Thermoacoustic Engines," 84 J. Acoust. Soc. Am., No. 4, pp. 1145-1180 (Oct. 1988).

Primary Examiner—Ronald C. Capossela
Attorney, Agent, or Firm—Ray G. Wilson; Paul D. Gaetjens; William R. Moser

[57] ABSTRACT

A compact acoustic refrigeration system actively cools components, e.g., electrical circuits (22), in a borehole environment. An acoustic engine (12, 14) includes first thermodynamic elements (12) for generating a standing acoustic wave in a selected medium. An acoustic refrigerator (16, 26, 28) includes second thermodynamic elements (16) located in the standing wave for generating a relatively cold temperature at a first end of the second thermodynamic elements (16) and a relatively hot temperature at a second end of the second thermodynamic elements (16). A resonator volume (18) cooperates with the first and second thermodynamic elements (12, 16) to support the standing wave. To accommodate the high heat fluxes required for heat transfer to/from the first and second thermodynamic elements (12, 16), first heat pipes (24, 26) transfer heat from the heat load (22) to the second thermodynamic elements (16) and second heat pipes (28, 32) transfer heat from first and second thermodynamic elements (12, 16) to the borehole environment.

15 Claims, 9 Drawing Sheets

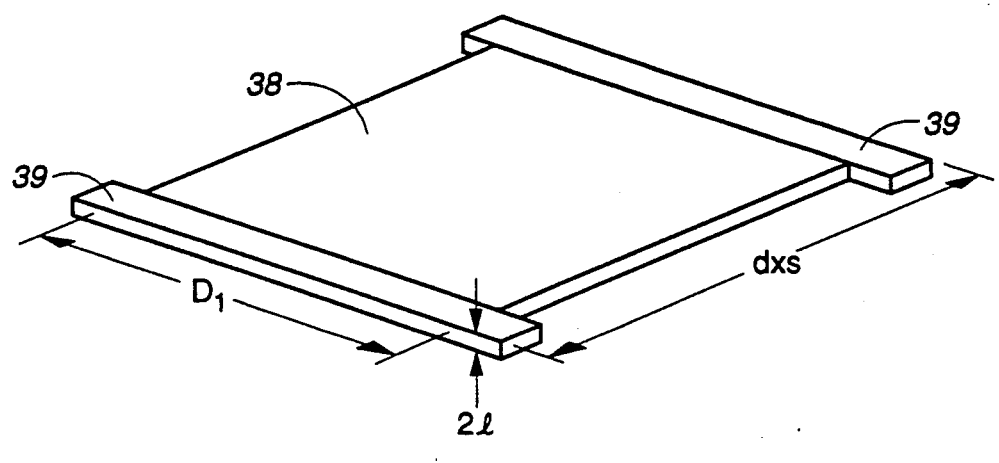
Fig. 9
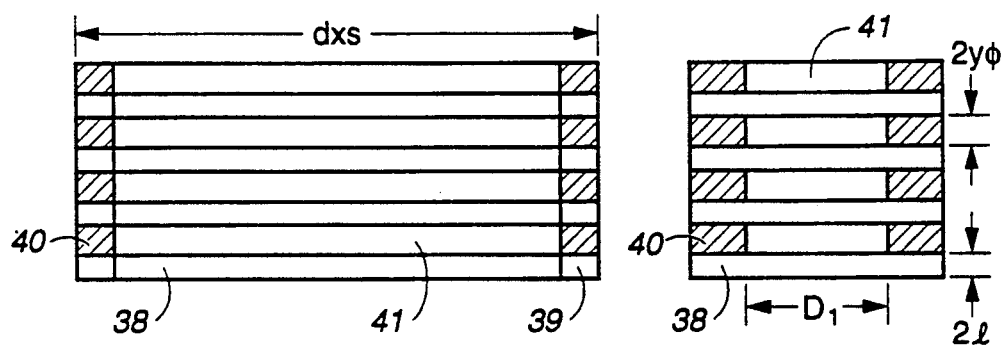
Fig. 10A  Fig. 10B

COMPACT ACOUSTIC REFRIGERATOR

This invention is the result of a contract with the Department of Energy (Contract No. W-7405-ENG-36).

BACKGROUND OF THE INVENTION

This invention relates to acoustic refrigeration and, more particular, to compact acoustic refrigeration for use in high temperature, downhole environments.

There are many applications where instrumentation must be placed in a hostile downhole environment, e.g., geothermal energy development, oil field exploration and production, etc. As an example, the geothermal borehole at Fenton Hill, NM, extends to 4270 m with bottom hole temperatures as high as 350° C. and total pressures of 82.7 MPa. Current technology tools and instruments can have difficulties at temperatures above 200° C., i.e., signal quality degradation, calibration drifting, and electrical component failures.

Thermal protection in downhole environments is presently provided by the use of temperature hardened components and/or passive thermal protection systems. A typical passive thermal protection system consists of a hot service dewar and a set of heat sinks to provide for interior low temperature energy storage. Passive heat absorption is volume limited by the heat sink and other material inside the protected space. Further, a passive protection system can reach thermal equilibrium only at the wellbore temperature. It will also be appreciated that the protective dewars are equally effective in confining heat dissipated by the electronics as they are in resisting heat input from the wellbore. There is no passive mechanism for transferring heat from inside the dewar back to the wellbore against the temperature gradient.

Downhole research under increasingly harsher conditions and higher wellbore temperatures indicates a need for a high temperature, multiwatt cooling system capable of greatly increasing the residence time and the reservoir temperature capability of instruments beyond the limits currently available from passive temperature protection systems. There are, however, many restrictions that must be met by any active refrigeration system for downhole use, i.e., the geometries and dimensions already established by the oil industry for downhole casing and tubing, tool standards, and typical transport chutes in logging trucks or trailers. Further, the refrigeration system must be reliable in the downhole environment and enable downhole operations over extended periods of time.

These and other problems associated with downhole environments are considered by the present invention and active refrigeration using an acoustic refrigerator enables reliable downhole cooling of associated electronic packages. Accordingly, it is an object of the present invention to provide a compact active refrigeration system for application to a downhole environment.

Another object of the present invention is to provide a compact acoustic refrigeration system.

One other object of the present invention is to provide an extremely efficient and compact heater and heat exchangers capable of transferring high heat fluxes to and from the acoustic refrigerator elements.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a compact refrigeration system for use in cooling electronic components in a thermal environment. An acoustic engine includes first thermodynamic elements for generating a standing acoustic wave in a selected medium. An acoustic refrigerator includes second thermodynamic elements that are located in the standing wave at a location effective to generate a relatively cold temperature at a first end of the second thermodynamic elements and a relatively hot temperature at a second end of the second thermodynamic elements. A resonator volume cooperates with the first and second thermodynamic elements to support the standing wave. First heat pipe means transfers heat from the electronic components to the first end of the second thermodynamic elements. Second heat pipe means then transfers heat from the second end of the thermodynamic elements and heat from the first thermodynamic elements to the thermal environment.

In another characterization of the present invention, a compact acoustic refrigerator allows active cooling in a constrained volume. An acoustic engine includes first thermodynamic elements for establishing a standing acoustic wave. Second thermodynamic elements are located in the standing acoustic wave at a location effective to obtain a first relatively cold end and a second relatively hot end, wherein the thermodynamic elements are plates having a greater spacing therebetween at the cold end than at the hot end.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 9 is an isometric view of an acoustic plate according to the present invention.

FIGS. 10A and 10B are side and end views of an acoustic plate stack assembly.

DETAILED DESCRIPTION OF THE INVENTION

Figure 1:
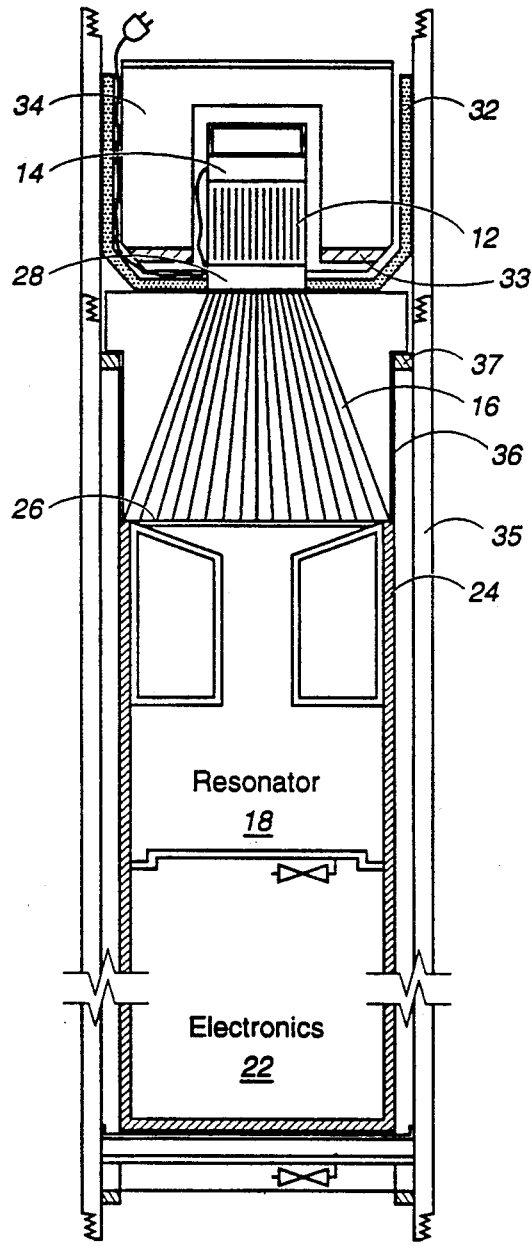
FIG. 1 is a pictorial illustration in partial cross-section of a miniaturized acoustic refrigeration system according to the present invention.

Referring first to FIG. 1, there is shown a pictorial illustration in partial cross-section of a compact acoustic refrigeration system assembly according to the present invention. Engine stack thermodynamic elements 12 are located next to electric heater elements 14 that produce a temperature difference across elements 12 effective to generate a standing wave in the internal resonant cavity that includes elements 12. Refrigeration stack 16 is coaxial with engine stack 12 and is located along the standing wave a distance effective to transmit heat along the elements forming refrigeration stack 16. The plates forming thermodynamic elements of refrigeration stack 16 are coplanar with corresponding ends of plates forming thermodynamic elements of engine stack 12.

The theory of thermoacoustic engines is generally discussed in G. W. Swift, "Thermoacoustic Engines," 84 J. Acoust. Soc. Am., No. 4, pp. 1145–1180 (October 1988), incorporated herein by reference. Refrigeration stack 16 is assumed to be located between the pressure and velocity nodes of the standing wave confined by resonator 18, which defines a large volume with an "acoustic capacitance" located at about a quarter-wave distance along the standing wave. Resonator 18 includes an upper section and a transition section to match the output area of refrigeration stack 16 to the reduced area tube that connects stack 16 to the large volume defined by the resonator capacitance. Resonator 18 is of rectangular geometry with losses generally formulated by Bennett.

An internal thermal load is represented by electronics package 22, which must be cooled for reliable long-term operation. Annular heat pipe 24 encloses electronics 22 and transfers heat to cold heat exchanger 26 in contact with the cold end of refrigeration stack 16. Heat exchanger 26 is preferably a micro heat pipe assembly, as hereinafter described, for transferring heat from annular heat pipe 24 to the ends of the thermodynamic elements that comprise refrigeration stack 16.

The action of the standing acoustic wave on the medium within refrigeration stack 16 is effective to transfer heat from cold heat exchanger 26 along the thermodynamic elements to hot heat exchanger 28. Hot heat exchanger 28 is also preferably comprised of micro heat pipes for efficiently transferring heat from the hot end of refrigeration stack 16 to a second annular heat pipe 32, which then rejects the heat to the surrounding environment. It will be understood that hot heat exchanger 28 is also in functional contact with engine stack 12 for removing residual heat after generation of the acoustic work that powers refrigeration stack 16. Hot dewar 34 encloses heater 14 and engine stack 12 to prevent heat losses to the environment. Pressure vessel 35 and integral dewar 36 are connected by plug 37 and surround the refrigerator assembly to provide both mechanical and thermal protection from the environment. In one aspect of the present invention, engine stack 12 and/or refrigeration stack 16 have a nonuniform separation between the plates forming the stacks. This modification allows the plate separation to be a uniform, an increasing, or a decreasing proportion of the thermal penetration depth, even for large temperature differences between ends and large ratios of temperature difference to mean stack temperature. The slope of the stack elements is selected to reduce acoustic losses in the stack. In particular, a constant slope is selected to approximate a conical loudspeaker horn and match the impedance at the stack entrance, i.e., a high pressure and low velocity, and transform it along the stack to a low pressure and high velocity. Thus, the distance between the thermodynamic elements 16 increases from the hot end of the refrigeration stack to the cold end.

Figure 2:
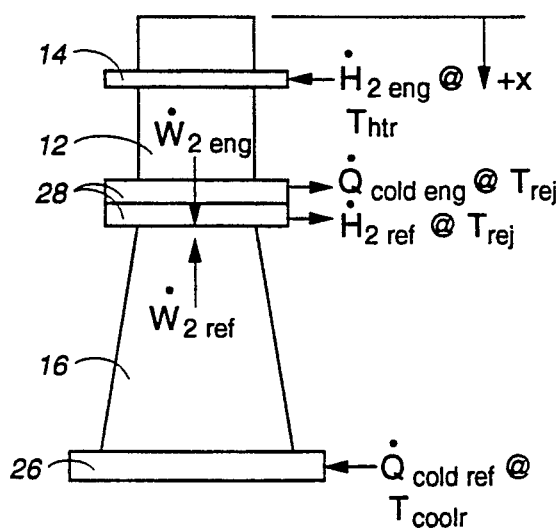
FIG. 2 illustrates heat and work flow in the refrigeration system shown in FIG. 1.

A thermoacoustic subsystem is shown in FIG. 2 to illustrate energy and work flows. $H_{2eng}$ is the heater 14 power, $\dot{W}_{2eng}$ is the acoustic power produced by the engine 12 and $\dot{Q}_{coldeng}$ is the residual engine heat rejected to the reservoir by heat exchanger 28. $\dot{W}_{2ref}$ is the refrigeration stack 16 acoustic loss and must be less than or equal to $\dot{W}_{2eng}$. $\dot{Q}_{coldref}$ is the total refrigerator heat load from heat exchanger 26, and $H_{2ref}$ is heat rejected to the reservoir from the refrigerator by heat exchanger 28. Assumed boundary conditions are 1) a lossless resonator tube at the engine inlet, 2) matching acoustic pressure and volume velocity at the engine and refrigerator interface, and 3) a lossless resonator tube at the refrigerator exit.

FIGS. 3–8 illustrate engine and refrigerator performance as a function of geometric parameters. FIGS. 3–6 more particularly depict the performance using a flat stack of thermodynamic elements for engine 12 and refrigeration stack 16 with matching acoustic impedance at the stack interface. Engine geometric parameters were varied to find optimums for the starting stack location, xs; plate separation, $y\phi_{eng}$; plate length, dxs; and total engine plate perimeter, $\pi$.

Figure 3:
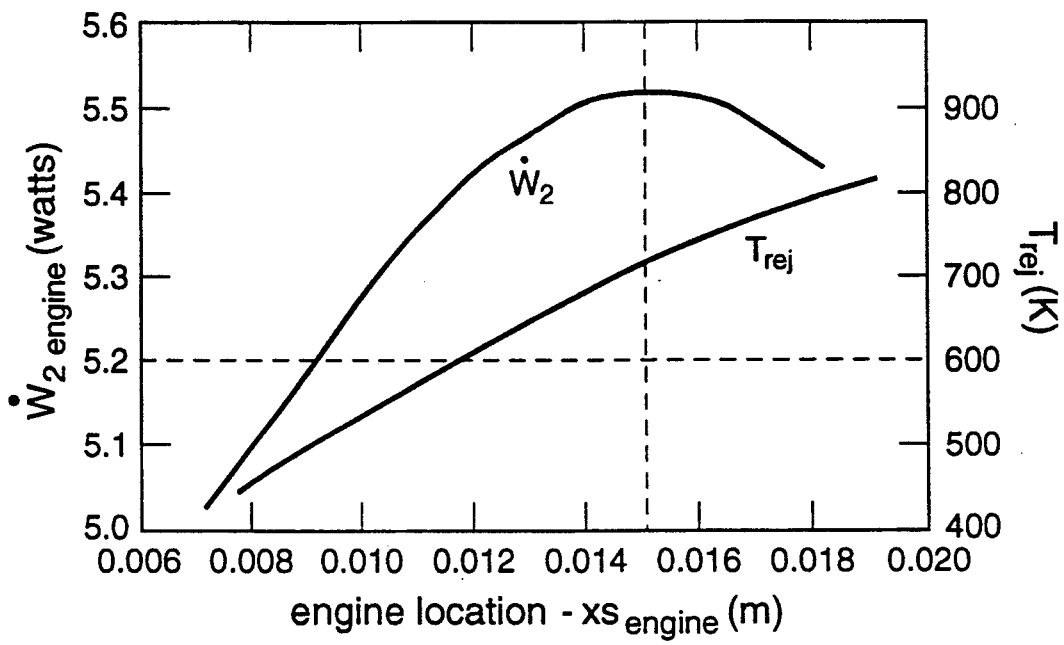
FIG. 3 graphically illustrates the sensitivities of engine power ($\dot{W}_2$) and heat rejection temperature ($T_{rej}$) to engine stack location (xs) along the standing wave.

FIG. 3 graphically illustrates the sensitivities of engine's 12 acoustic work output, $\dot{W}_{2eng}$, and reject temperature, $T_{rej}$, as a function of stack location, xs from the upper node of the standing wave. The $\dot{W}_{2eng}$ curve shows a local maximum between an xs of 0.014 and 0.016 m. The shape of the $\dot{W}_{2eng}$ curve is generally the product of acoustic pressure and velocity, which are both sinusoidal functions, relating to the work absorbed or produced along an acoustic plate. $T_{rej}$ increases about linearly with increasing initial stack location, i.e., increasing distance from the pressure node above engine 12. This means that mean plate temperature is approximately linearly proportional to the heat transport for a given location along the stack.

Figure 4:
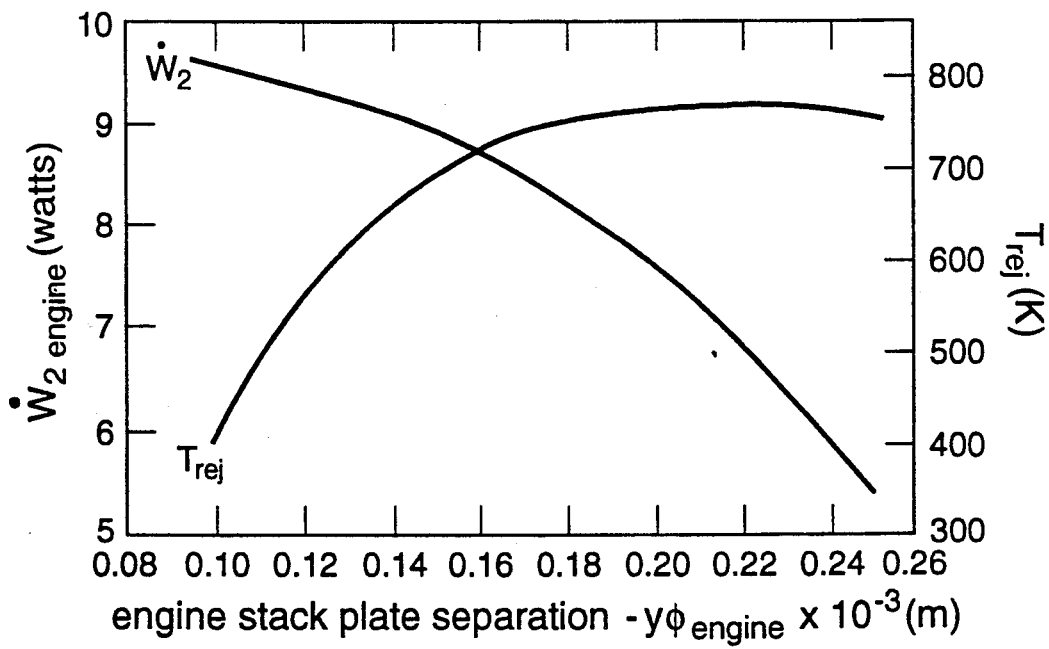
FIG. 4 graphically illustrates the sensitivities of engine power ($\dot{W}_2$) and heat rejection temperature ($T_{rej}$) to engine plate separation (y$\phi$).

Using an engine starting location of 0.015 m, the engine plate separation was then varied between 0.10 and $0.25 \times 10^{-3}$ m. FIG. 4 graphically illustrates the sensitivities of engine power, $\dot{W}_{2eng}$, and reject temperature, $T_{rej}$, as a function of engine stack 12 plate separation, $y\phi_{eng}$. $\dot{W}_{2eng}$ drops at an increasing rate for linear increases in plate separation, $y\phi$, while the $T_{rej}$ curve increases nonlinearly. The shape of the $T_{rej}$ curve shows that the product of the sinusoidal acoustic pressure and velocity affect the curve shape more strongly than does the linear proportionality between the plate mean temperature and heat flow. An engine plate separation of $0.15 \times 10^{-3}$ m was chosen for further evaluations because $T_{rej}$ approaches a local plateau near that value.

Figure 5:
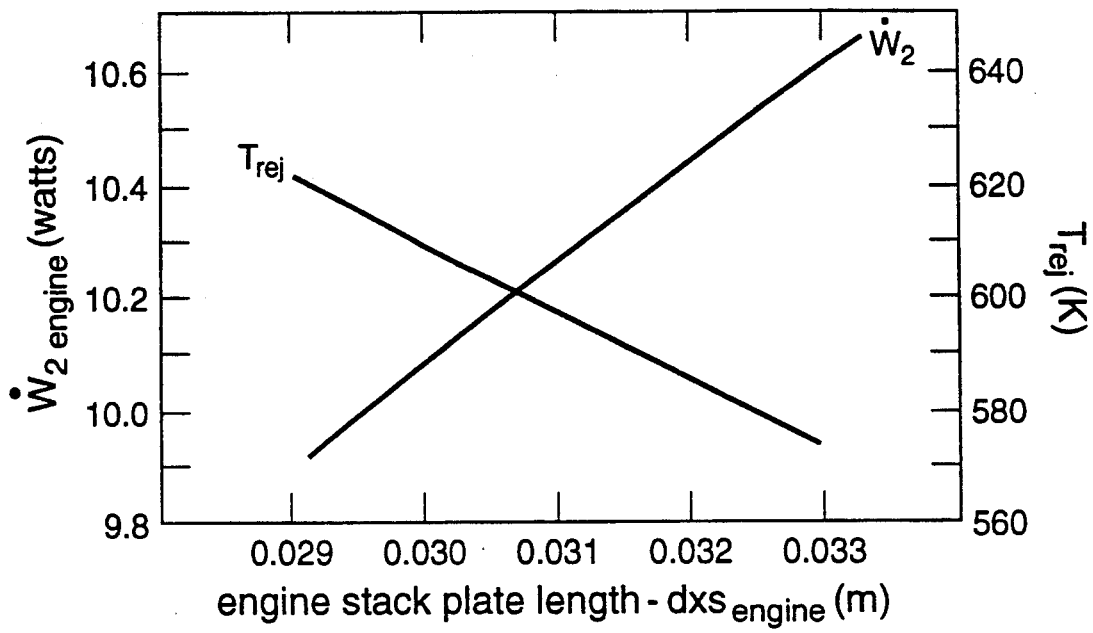
FIG. 5 graphically illustrates the sensitivities of engine power ($\dot{W}_2$) and heat rejection temperature ($T_{rej}$) to engine stack length (dxs).

Using the engine stack location, xs, and plate separation, $y\phi$, selected above, the engine stack plate length, dxs, was then varied between 0.029 and 0.033 m. FIG. 5 graphically illustrates the sensitivities of $\dot{W}_{2eng}$ and $T_{rej}$ to engine stack plate length, dxs. Linear increases in stack plate length, dxs, produce linearly increasing $\dot{W}_{2eng}$ and decreasing $T_{rej}$. The linear increase in $\dot{W}_{2eng}$ is from the linear proportionality between work and stack length. The linear $T_{rej}$ curve again arises since the mean plate temperature is linearly proportional to the heat transport for a given location along the stack.

Figure 6:
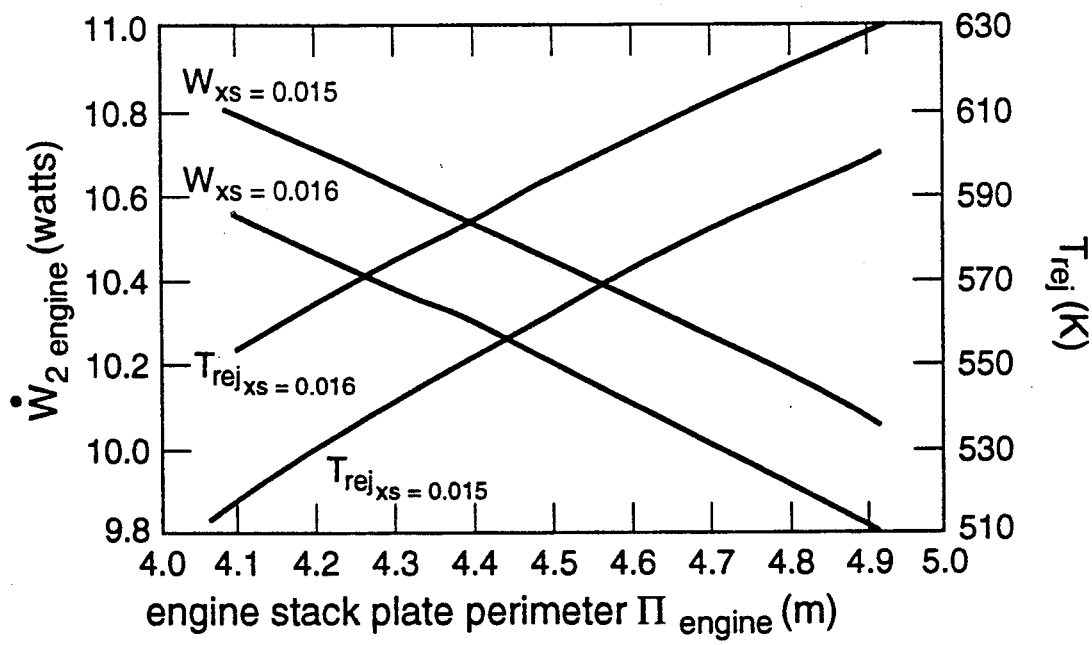
FIG. 6 graphically illustrates the sensitivities of engine power ($\dot{W}_2$) and heat rejection temperature ($T_{rej}$) to engine plate perimeter ($\pi_{engine}$) evaluated at plate lengths xs=0.015 and 0.016 meters.

FIG. 6 then graphically illustrates sensitivities of $\dot{W}_{2eng}$ and $T_{rej}$ to total engine stack plate perimeter, $\pi$, which is related to the engine volume, evaluated for two engine locations, xs, of 0.015 and 0.016 m. The results indicate that $\dot{W}_{2eng}$ and $T_{rej}$ are strong functions of xs at the selected stack locations.

In a reference design calculation, sloped stacks were examined for engine stack 12 and refrigeration stack 16, where equal plate separations were provided at the interface of the engine and refrigeration stacks to avoid viscous losses from fluid direction changes and to enable a common heat exchanger 28 between the units. The engine stack begins with its optimum plate spacing and ends near the optimum refrigeration stack plate spacing.

Figure 7:
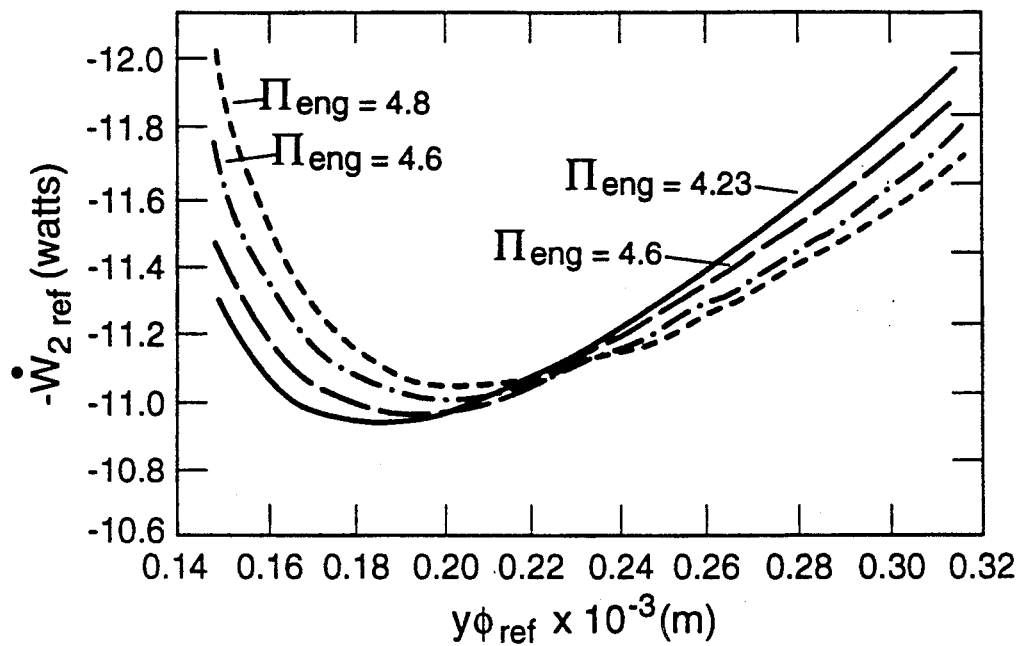
FIG. 7 illustrates the sensitivities of refrigeration capacity ($\dot{W}_2$) to engine stack plate separation (y$\phi$) evaluated at engine plate perimeters of 4.23, 4.4, 4.6, and 4.8 meters.

FIG. 7 graphically illustrates the sensitivities of refrigeration losses, $\dot{W}_{2ref}$, to refrigeration stack plate spacing, $y\phi_{ref}$, at various engine stack perimeters, $\pi$. Each curve shows a minimum, with the minima moving toward smaller refrigerator $y\phi$ for smaller engine $\pi$. The smallest refrigerator loss occurs for the case where the engine and refrigerator $\pi$ and $y\phi$ match at the interface, i.e., where there is no area change required for matching impedances. This nonlinear response for changes in $\dot{W}_{2ref}$ as a function of $y\phi$ results from the sinusoidal product of acoustic pressure and velocity. The fact that the optimum $\dot{W}_{2ref}$ shifts to smaller refrigerator $y\phi$ for the refrigeration stack very close to the corresponding $y\phi$ for the engine stack illustrates that losses are substantially reduced for matching impedances that do not involve step changes in geometry at the engine and refrigerator interface.

Figure 8:
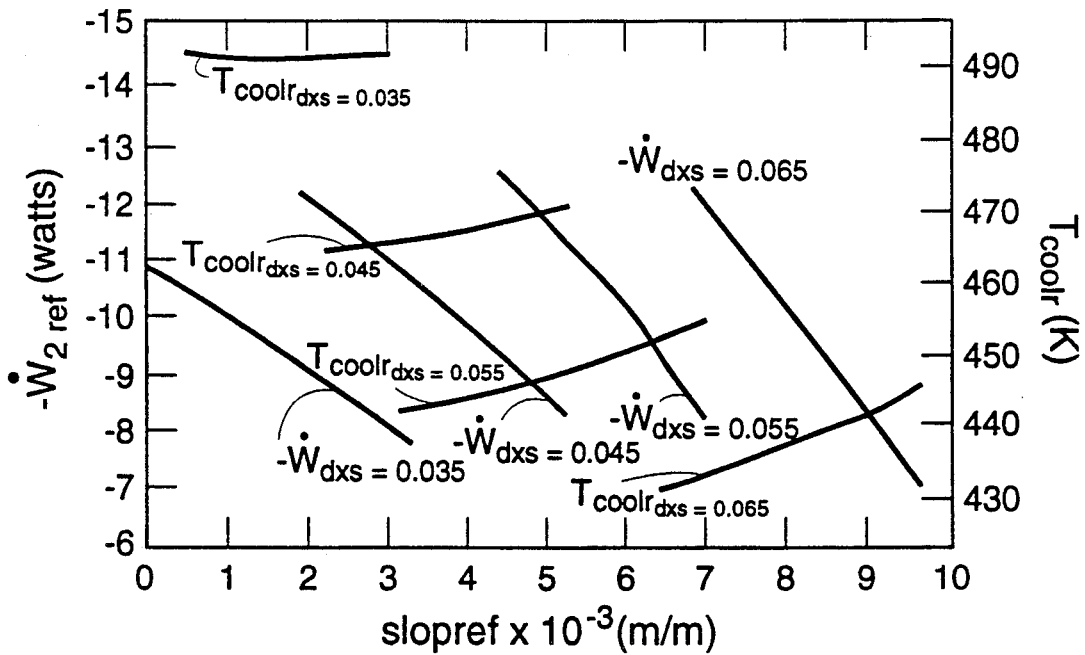
FIG. 8 illustrates the sensitivities of refrigeration capacity ($W_2$) and refrigeration temperature ($T_{coolr}$) to refrigerator stack plate slope and stack plate length (dxs).

FIG. 8 illustrates the sensitivities of refrigeration losses, $\dot{W}_{2ref}$, and refrigeration temperature, $T_{coolr}$, to refrigeration stack plate slope, sloperef, and stack plate length, dxs. Refrigerator losses decrease with increasing positive slope because the viscous losses decrease as a result of lower acoustic velocities in larger acoustic fluid passages created by the increasing slope. For a given slope, the refrigerator losses increase with increasing stack length because of the direct proportionality between work and stack length. Extra losses from a longer stack used to reach a lower $T_{coolr}$ can be compensated for by increasing the slope. The decrease in $T_{coolr}$ for increasing stack lengths arises from the fact that the stack midpoint moves farther along the standing acoustic wave. For a fixed heater input, $\dot{H}_{2eng}$, this results in integrating farther along a longer stack with the same mean temperature gradient, resulting in lower temperatures at the outlet end of the longer stack.

A reference thermoacoustic subsystem design, Table A, was selected to provide about 8 watts of cooling power, $\dot{Q}_{coldref}$, based on the sensitivities shown in FIGS. 3-8. Design trade-offs were made to optimize the work output from engine 12, reducing losses at the interface between engine 12 and refrigeration stack 16, and minimizing losses in refrigeration stack 16.

Referring now to FIGS. 9, 10A, and 10B, both the engine 12 and refrigerator 16 acoustic stacks are assembled by alternately stacking acoustic plates 38, 39 and spacers 40 to the design dimensions, e.g., the dimensions shown in Table A. Each acoustic plate 38 is initially made wide enough to accommodate end tabs 39 and then etched or micromachined to the final plate 38 dimension with tab 39 having the same width as the adjacent micro heat exchangers, discussed below. Tabs 39 provide structural support and thermal connection between the heat exchangers 26, 28 (FIG. 1) and acoustic plates 38. Spacer thickness 40 is controlled to provide the required flow passage spacing 41 between adjacent acoustic plates 38 as well as the correct slope when the assembly is stacked and bonded together.

In a preferred embodiment, engine stack 12 plates are fabricated from $ZrO_2$ because its low thermal conductivity acts to limit plate conduction losses and its strength is comparable to many metals. Refrigeration stack 16 plates are fabricated from fiberglass or fluorophlogopite, whose trade name is SUPRAMICA (available from Mykroy/Mycalex Ceramics, Midwest Mica Insulation Div., Kirkwood, Ind.), where refrigerator losses are about the same in both materials. SUPRAMICA is preferred because it is a rigid ceramic with more stiffness at a given thickness than fiberglass.

TABLE A

| Engine and Refrigerator Reference Design | |
|---|---|
| Engine | $\dot{H}_{2eng} = +44$ W, $\dot{W}_{2eng} = 10.35$ W |
| | $\dot{Q}_{cold\,eng} = 33.65$ W, $\eta = 0.235$ |
| | $T_{htr} = 1473$K, $T_{rej} = 603$K |
| | 74 $ZrO_2$ plates, thickness = 0.08 mm |
| | $D_1 = 2.83$ cm, dxs = 2.7 cm |
| | ll = 4.23 m at x = 1.6 cm |
| | $y\phi_{entr} = .15$ mm, $y\phi_{exit} = .167$ mm |
| | slope = 0.636 mm/m |
| Refrigerator | $\dot{H}_{2ref} = -15$ W, $\dot{W}_{2ref} = -7.23$ W |
| | $\dot{Q}_{cold\,eng} -7.77$ W, cop = 1.07 |
| | $T_{coolr} = 445$K, $T_{rej} = 603$K |
| | 74 SUPRAMICA plates, thickness = 0.08 mm |
| | $D_1 = 2.83$ cm, dxs = 6.5 cm |
| | ll = 4.23 m at x = 4.34 cm |
| | $y\phi_{entr} = .167$ mm, $y\phi_{exit} = .785$ mm |
| | slope = 9.5 mm/m |

Figure 11A:
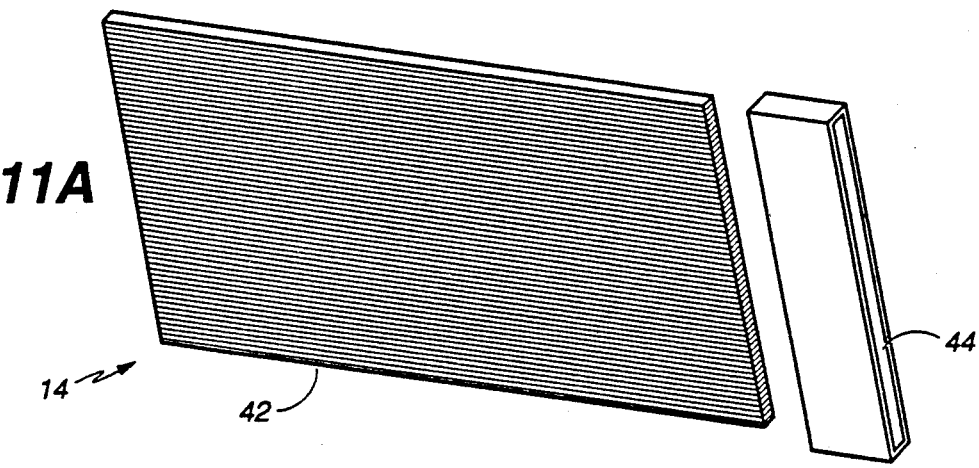
FIG. 11A is a pictorial assembly view in exploded, isometric form of an engine heater according to the present invention.
Figure 11B:
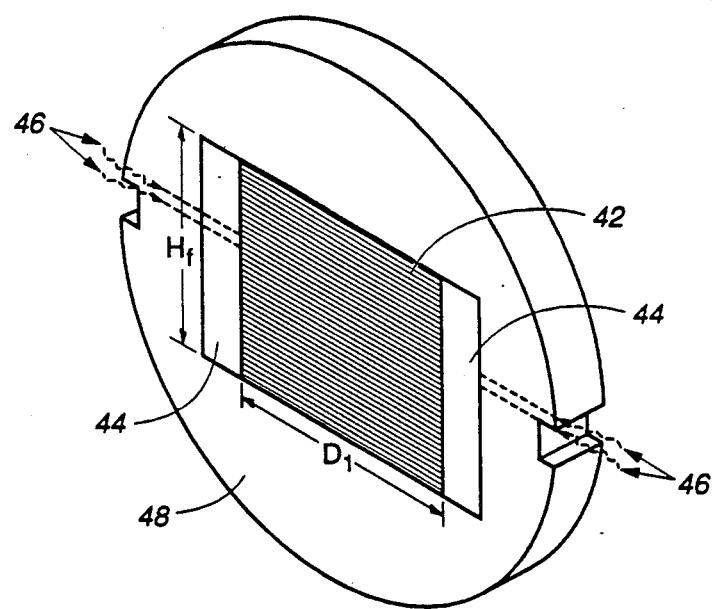
FIG. 11B is an isometric view of a complete assembly of the heater shown in FIG. 11A in a protective mold.
Figure 11C:
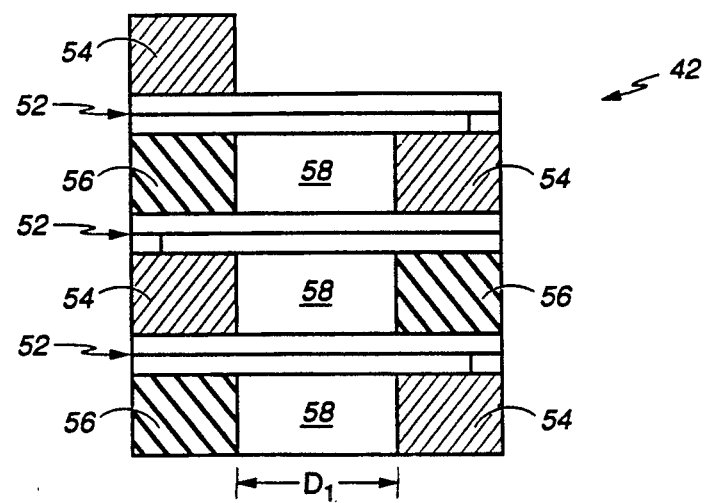
FIG. 11C is a partial cross-section of the heater circuit shown as a complete stack in FIG. 11A.
Figure 15:
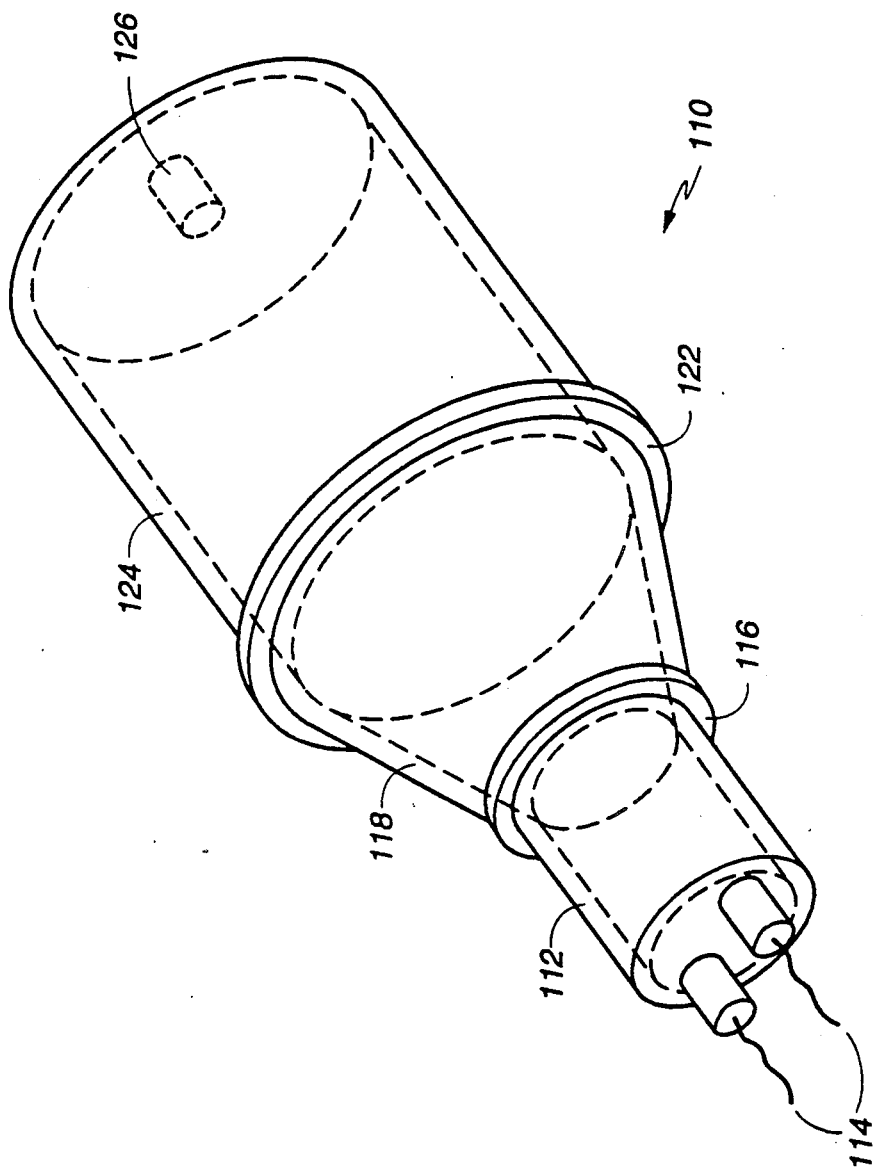
FIG. 15 is an isometric illustration of a pressure vessel for enclosing the refrigerator and resonator mold assembly shown in FIGS. 1 and 14

Referring now to FIGS. 11A, 11B, and 11C, there is depicted a heater assembly 14 for providing thermal energy $\dot{H}_{2eng}$ to acoustic engine 12. A heater stack assembly 42 is assembled as shown in FIG. 11C to provide series connected heater plates 52 by alternately providing low resistivity spacers 54 with insulating spacers 56. Spacers 54, 56 are sized to provide one heater element 52 along the edge of each plate tab 39 (FIG. 9). Heater elements 52 are preferably formed from thin strips of a ceramic with a contiguous CVD coated graphite layer. An insulating sleeve 44 is provided at each end of heater stack assembly 42 to electrically insulate the conducting heater circuit plates from the metal wall of resonator pressure vessel 110 (FIG. 15).

Figure 14:
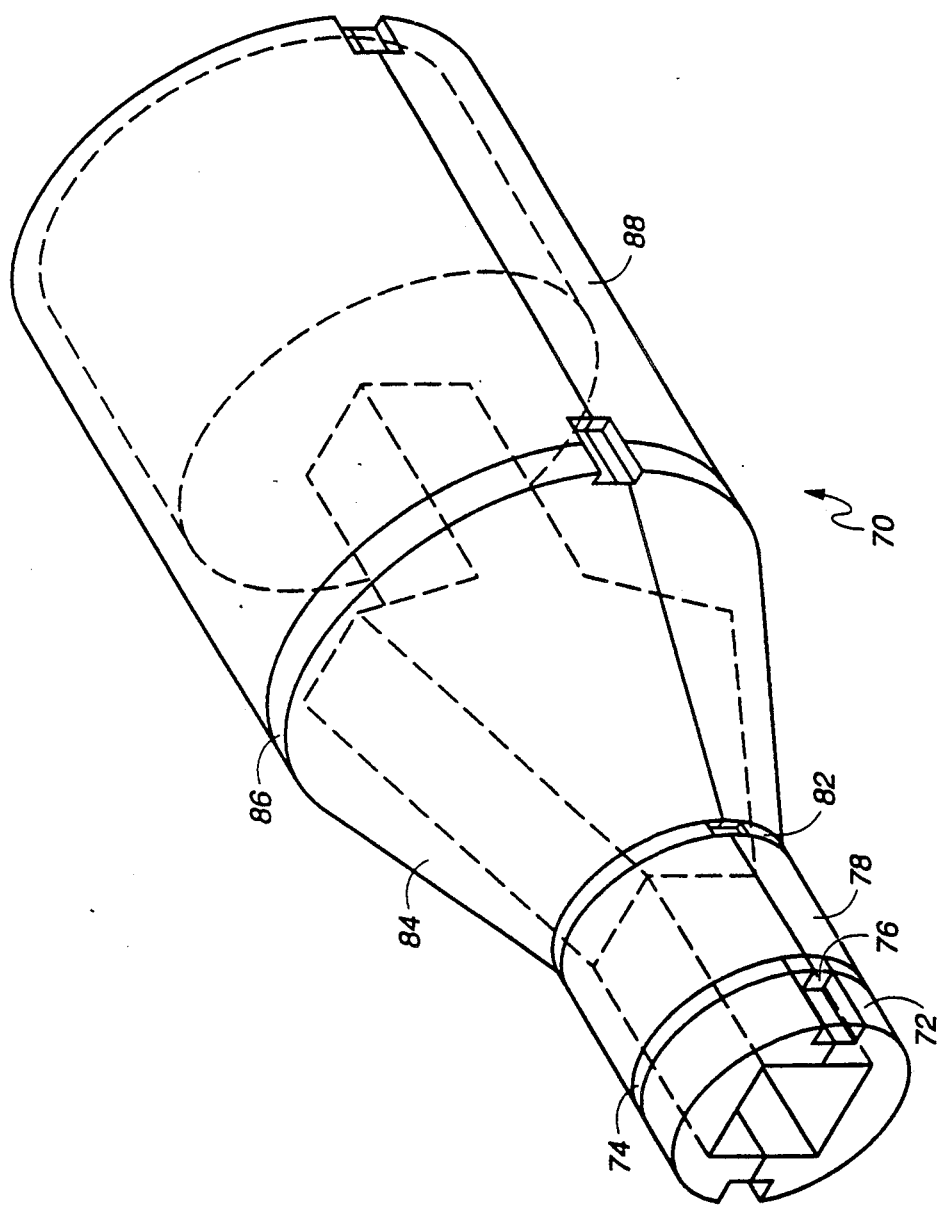
FIG. 14 is an isometric illustration of a resonator mold assembly for enclosing the refrigerator shown in the upper part of FIG. 1.

The assembly of heater elements 52 and spacers 54, 56 requires a jig into which the micro sized parts are placed. For the design illustrated by Table A, 37 heater strips 52 are connected in electrical series by low resistance spacers 54, with two such parallel circuits each with about 550 ohms, with a total current of 0.4 A to provide a total of 44 W. As shown in FIG. 11B, the heater assembly 42, 44 is placed in an electrically insulating ceramic mold 48 that provides the support and locating keyways for installation in the resonator assembly (FIG. 14). Metal spacer plates that define fluid passages 58 are chemically removed after heater assembly 42 is sealed within mold 48. Mold 48 also supports and protects electrical leads 46 for connection to an external power cable.

Heat exchangers 28, 26 (FIG. 1) are required for thermal transfer to/from the ends of plates forming engine stack 12 and refrigeration stack 16. The heat pumping capability of the acoustic engine and refrigerator stacks 12, 16 according to the present design provide very high heat fluxes at the inlet and outlet ends of each stack that require micro heat pipe heat exchangers for transfer to surrounding annular heat pipes 24. 32 without excessive temperature drop along the heat exchanger.

Heat exchanger plate lengths adjacent the respective stack plates are sized to avoid reaching the burnout limit on the adjoining evaporator section of the associated annular heat pipe and are sized short enough to limit the temperature drop along each heat exchanger. All other heat exchanger dimensions are defined by the geometry of the associated acoustic stack, Table A, and the local acoustic velocity at the particular location. Fluid oscillations at any location in the acoustic stack are proportional to twice the ratio of the acoustic velocity to the angular frequency. This displacement magnitude represents the optimum width of an acoustic heat exchanger at the ends of a stack.

Figure 12:
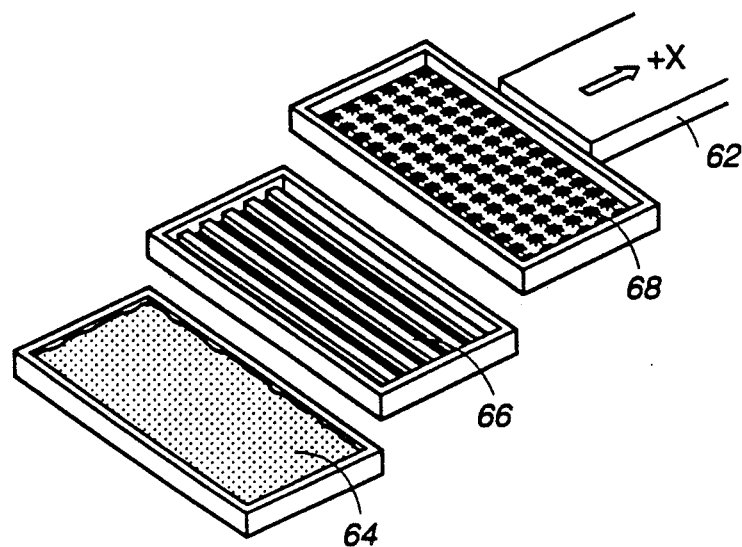
FIG. 12 illustrates micro heat pipes in functional proximity to an acoustic stack plate.
Figure 13:
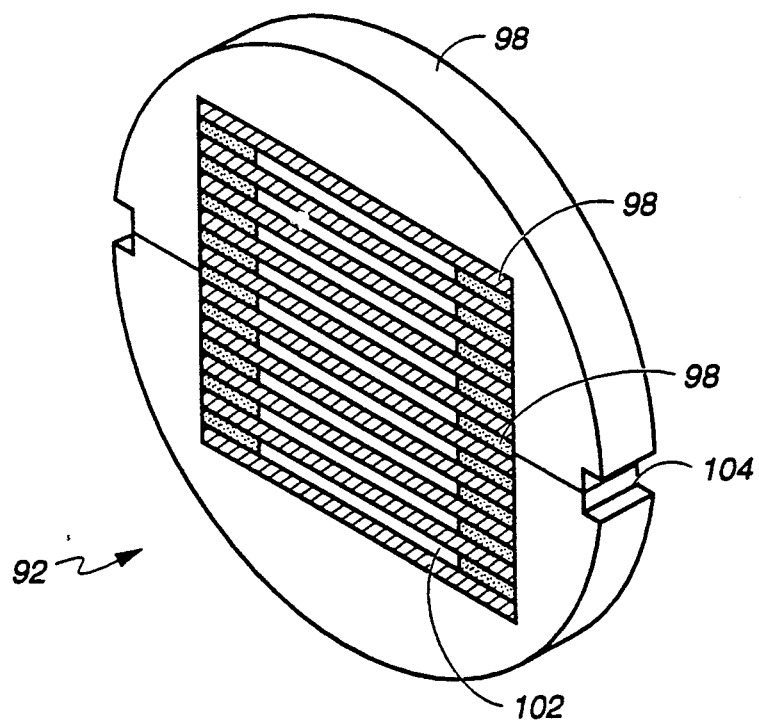
FIG. 13 is an isometric illustration of a micro heat pipe heat exchanger and mold assembly.

Referring now to FIGS. 12 and 13, a suitable heat exchanger design using micro heat pipes is depicted. Heat pipes generally include wicking materials for holding and transporting the thermal medium liquid phase between condensation region and an evaporation region and internal voids for transporting a medium gas phase from the evaporation region to the condensation region. Suitable wicks for micro heat pipes include a porous metal wick 64, a grooved ceramic wick 66, and a very fine ceramic dimple pattern 68, formed by machining two V-shaped series of grooves at right angles. Half of each micro heat pipe-type is shown in FIG. 12. Two ceramic halves are bonded together to form a micro heat pipe heat exchanger. A suitable thermal medium, such as Hg, H$_2$O, or a diphenyl-diphenyl oxide eutectic whose trade name is Dowtherm A (available from Dow Chemical Co.) is selected for the particular acoustic stack to be served. The selected heat pipe is placed adjacent the end of a heat stack plate 62 for good thermal conduction.

The design parameters of suitable micro heat pipes are set out in Table B to correspond with the thermoacoustic engine design set out in Table A.

TABLE B

| | Micro Heat Pipes |
|---|---|
| Hot | $\dot{Q}$/pipe = 0.324 W, T$_{op}$ = 604K, $\Delta$T = 24K<br>Mo wick, Cr container, Hg fluid<br>Thick = 0.08 mm, w = 3.4 mm, length = 24 mm |
| Cold | $\dot{Q}$/pipe = 0.054 W, T$_{op}$ = 445K, $\Delta$T = 1K<br>Mo wick, Cr container, H$_2$O fluid<br>Thick = 0.08 mm, w = 4.0 mm, length = 24 mm |

Fabrication of grooved heat pipe 66 or ceramic mesh heat pipe 68 is done using conventional photolithography techniques and/or micro machining with a laser or diamond cutting tool. Porous metal wick 64 is fabricated by placing a porous wick material in a mold and pressing a solid piece of the material forming the wick or another suitable solid material onto the porous wick to form one half of the vapor flow space. The wick would then be flooded with molten aluminum to fill the entire porous wick body and the assembly plated with a relatively thick metal layer on all external surfaces. The plating forms the exterior container wall of the micro heat pipe. The aluminum in the porous mesh is chemically removed and the solid plate can be then physically removed from the wick.

FIG. 13 is an isometric illustration of a micro heat pipe assembly 92 forming a heat exchanger for use in the present invention. Heat pipes 94 are spaced apart by spacers 96 sized to align heat pipes 94 with adjacent acoustic stack plates and provide flow passages 102 through which the acoustic medium moves without viscous losses associated with changes in flow direction. Support mold 98 protects and surrounds the heat pipes for incorporation in the complete mold assembly (FIG. 14). Support mold 98 is preferably molybdenum rather than ceramic to improve the thermal connection to the tabs 116. 122 on resonator vessel 110 (FIG. 15) and subsequently to the annular heat pipes.

Annular heat pipes 24 and 32 (FIG. 1) are of generally conventional design and analysis with wick type elements mounted adjacent the exterior surfaces and a vapor annulus therebetween. Design parameters are set out in Table C for a design compatible with the micro heat pipe designs set out in Table B.

TABLE C

| | Annular Heat Pipe Designs |
|---|---|
| Heat Pipe 32 | $\dot{Q}$ = 48 W, T$_{op}$ = 579K, $\Delta$T = 4K<br>200 mesh SS wick, Cu container, Thermex fluid<br>t$_{wall}$ = 0.89 mm, l$_{tot}$ = 17 cm<br>OD = 13.56 cm, ID = 12.3 cm<br>Maximum T$_{wellbore}$ = 570K |
| Heat Pipe 24 | $\dot{Q}$ = 8 W, T$_{op}$ = 449K, $\Delta$T = 3K<br>200 mesh SS wick, Cu container, H$_2$O fluid<br>t$_{wall}$ = 0.89 mm, l$_{tot}$ = 78.3 cm<br>OD = 12.67 cm, ID = 12.18 cm<br>Minimum T$_{elect}$ = 454K |

Referring now to FIG. 14, there is shown an isometric view of the resonator mold assembly 70. Resonator mold 70 is arranged in axial sections comprising the front section 72, engine section 78, conical refrigerator section 84, and the cylindrical capacitance 88. Heater ring 74 contains the heater assembly (FIG. 11B) and provides electrical connections 76. Hot heat exchanger ring 82 contains the hot micro heat pipe assembly (Table B) and cold heat exchanger ring 86 contains the cold micro heat pipe assembly (Table B). The interior surfaces of mold assembly 70 are depicted by the dashed lines. Various alignment keyways are provided along mold assembly 70 for alignment within pressure vessel 110 (FIG. 15).

A resonator pressure vessel assembly 110 is shown in FIG. 15 for thermally and physically protecting the thermoacoustic components. Pressure vessel 110 is formed from engine vessel 112, refrigerator vessel 118, and capacitance vessel 124. Electrical power for heater 14 (FIG. 1) is accessed through ceramic pin seals 114 on the end face of the front section. Gas fill valve 126 at the base of capacitance vessel 124 provides access for evacuating, purging, and refilling the resonator with a suitable refrigerant, such as helium. Thick tabs 116 and 122 are provided for attaching the hot 32 and cold 24 annular heat pipes. Heat pipe rings 82 and 86 are soldered or clamped to tabs 116 and 122, respectively, to obtain the requisite thermal contact.

Dewars 34 and 36 (FIG. 1) provide thermal protection and limit heat transport between the enclosed components and the environment. Dewar 36 is primarily designed to limit the transfer of environmental heat to the electronic components and refrigerator components. Pressure vessel 35 provides mechanical protection for dewar 36 and the space therebetween is evacuated to provide effective resistance to radiation heat transfer. Very low conductivity insulation, such as Min-K (available from Manville Corporation) and superinsulation (available from Speciality Steel Forge, Inc. and Fiber Materials, Inc.), substantially reduces radial thermal transmission. The dewar construction preferably employs multiple layers of superinsulation and polished interior vessel surfaces plated with either nickel or chrome to achieve a high total hemispherical emissivity.

Dewar 34 acts to limit radial heat leaks from acoustic engine 12 (FIG. 1) to the wellbore and axial heat leaks to the refrigeration section. The hot dewar walls and base contain the same thickness of superinsulation, which is very thick to limit radiation heat transfer. The base of dewar 34 does not require a centering device, because mechanical forces tend to compress the superinsulation rather than cause buckling from an impact or tensile or shear failure at the welded plug 33 that connects the inner and outer cylinders of dewar 34. Because the temperature of the inner dewar wall is very nearly the same as the acoustic engine stack, the dewar body is preferably constructed from refractory metals such as molybdenum or TZM. Design specifications for the two dewars compatible with the component designs set out in Tables A, B, and C are set out in Table D.

TABLE D

| Dewar Design Parameters | |
|---|---|
| Hot dewar | TZM walls and plug, Cr plating<br>SiO$_2$ multilayer insulation<br>OD = 12.5 cm, ID = 5.44 cm, length = 4.4 cm |
| Cold dewar | 4140/42 HF-Q&T walls and plug, Ni plating<br>SiO$_2$ multilayer insulation<br>OD = 15.2 cm, ID = 12.7 cm, length = 78.2 cm |

Thus, the thermoacoustic refrigeration system according to the present invention operates between 1473 and 445 K at a mean pressure of 20 bar and uses refractory metals, ceramics, and an inert gas that avoids cavitation problems, simplifies handling and maintenance, and allows reliable operation in hostile environments. The resonator design separates, to a large extent, the requirement for simultaneous operation at high temperature and pressure. The simple heater circuit with two parallel heaters and the micro heat pipes represent similar power input and output capabilities for operation at high power density and high heat flux. A heater with thin conductors and porous mesh micro heat pipes represent substantial increases in power input and output capabilities over those used in existing thermoacoustic engines or refrigerators.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A compact refrigeration system for use in cooling electronic components in a thermal environment, comprising:
   an acoustic engine including first thermodynamic elements for generating a standing acoustic wave in a selected medium;
   an acoustic refrigerator including second thermodynamic elements located in said standing wave for generating a relatively cold temperature at a first end of said second thermodynamic elements and a relatively hot temperature at a second end of said second thermodynamic elements;
   a resonator volume cooperating with said first and second thermodynamic elements to support said standing acoustic wave;
   first heat pipe means for transferring heat from said electronic components to said first end of said second thermodynamic elements; and
   second heat pipe means for transferring heat from said second end of said second thermodynamic elements and from said first thermodynamic elements to said thermal environment.

2. A compact refrigeration system according to claim 1, wherein said first thermodynamic elements include heater elements formed on a first end of said first thermodynamic elements to input thermal energy for producing acoustic work and a temperature differential across said first elements effective to produce said standing acoustic wave.

3. A compact refrigeration system according to claim 2, wherein said second thermodynamic elements are plates having a spacing therebetween that increases from said second end to said first end.

4. A compact refrigeration system according to claim 3, wherein said first heat pipe means includes a first annular heat pipe enclosing said electronic components and a first micro heat pipe assembly thermally connecting said first annular heat pipe and said first end of said second thermodynamic elements.

5. A compact refrigeration system according to claim 2, wherein said first heat pipe means includes a first annular heat pipe enclosing said electronic components and a first micro heat pipe assembly thermally connecting said first annular heat pipe and said first end of said second thermodynamic elements.

6. A compact refrigeration system according to claim 1, wherein said second thermodynamic elements are plates having a spacing therebetween that increases from said second end to said first end.

7. A compact refrigeration system according to claim 6, wherein said first heat pipe means includes a first annular heat pipe enclosing said electronic components and a first micro heat pipe assembly thermally connecting said first annular heat pipe and said first end of said second thermodynamic elements.

8. A compact refrigeration system according to claim 1, wherein said first heat pipe means includes a first annular heat pipe enclosing said electronic components and a first micro heat pipe assembly thermally connecting said first annular heat pipe and said first end of said second thermodynamic elements.

9. A compact refrigeration system according to claim 1, wherein said second heat pipe means includes:
a second micro heat pipe assembly for transferring heat from said second end of said second thermodynamic elements and said acoustic engine; and
a second annular heat pipe enclosing said acoustic engine for receiving said heat from said second end of said second thermodynamic elements and said acoustic engine and rejecting said heat to said thermal environment.

10. A compact refrigeration system according to any of claims 1-9, wherein said first thermodynamic elements include plate elements having an increasing space therebetween in the direction of said second thermodynamic elements.

11. A compact refrigeration system according to claim 10, wherein plates of said first thermodynamic elements are coplanar with corresponding ones of said second ends of said second thermodynamic elements.

12. A compact refrigeration system according to claim 1, further including an insulating ceramic mold enclosing said first and second thermodynamic elements.

13. In a compact acoustic refrigerator, an improved acoustic engine for transferring heat from a first heat exchanger to a second heat exchanger, comprising:
first thermodynamic elements for establishing a standing acoustic wave; and
second thermodynamic elements located in said standing wave for generating a relatively cold temperature along a surface of a first end of each one of said second thermodynamic elements and a relatively hot temperature along a surface of a second end of said each one of said second thermodynamic elements wherein said second thermodynamic elements are plates having a greater spacing therebetween at said first end than at said second end.

14. An improved acoustic engine according to claim 13, wherein:
said first heat exchanger includes first micro heat pipes for transferring heat from a thermal load to said first end of said second thermodynamic elements; and
said second heat exchanger includes an annular heat pipe connected to an external heat sink and second micro heat pipes for transferring heat from said second end of said second thermodynamic elements and heat from said first thermodynamic elements to said annular heat pipe.

15. An improved acoustic engine according to claim 14, wherein said first and second micro heat pipes include heat transfer surfaces aligned with said surfaces of said first and second ends, respectively, of said second thermodynamic elements.

* * * * *